Dec. 11, 1928.

T. E. HOLMES 1,694,854

ROLLING MILL

Filed Jan. 13, 1928  3 Sheets-Sheet 1

INVENTOR
T. E. Holmes

Dec. 11, 1928.　　　　　　T. E. HOLMES　　　　　1,694,854
ROLLING MILL
Filed Jan. 13, 1928　　　　3 Sheets-Sheet 2

INVENTOR.
T. E. Holmes

Dec. 11, 1928.

T. E. HOLMES 1,694,854

ROLLING MILL

Filed Jan. 13, 1928   3 Sheets-Sheet 3

INVENTOR.
T. E. Holmes

Patented Dec. 11, 1928.

1,694,854

UNITED STATES PATENT OFFICE.

THOMAS EDMUND HOLMES, OF GLASGOW, SCOTLAND.

ROLLING MILL.

Application filed January 13, 1928, Serial No. 246,624, and in Great Britain January 8, 1927.

This invention relates to universal spindle fittings for rolling mills, in particular two-high metal rolling mills, and has for an object to provide an improved and stronger construction of spindle coupling such as to afford larger driving and bearing surfaces without detraction from the ability to remove the spindles without disturbing the rolls or the pinions, or to remove the rolls or the pinions without disturbing the spindles.

According to the invention, the universal spindle or each spindle is provided with a trunnion or trunnions to which are fitted swivel blocks accommodated in opposed internal sockets in a coupling box, and an adapter on the roll arbor (if fluted) is formed with diametrally opposed projections presenting driving faces engageable with a second set of internal sockets in the coupling box; or in the case of a new roll the roll arbor may be formed with such projections.

The box member may be of circular or oval cross section; in the latter case the minor axis of the oval may be approximately the maximum permissible by the design, while the length of the major axis is determined by the length of the minor axis and may be in any event greater than the distance between the axes of the two rolls, even in the case where universal spindles are used for both the top and bottom rolls.

The coupling arrangement at the pinion end of the spindle may be as above described.

Alternatively, the above described arrangement may be adopted at the pinion end only.

Figure 1:
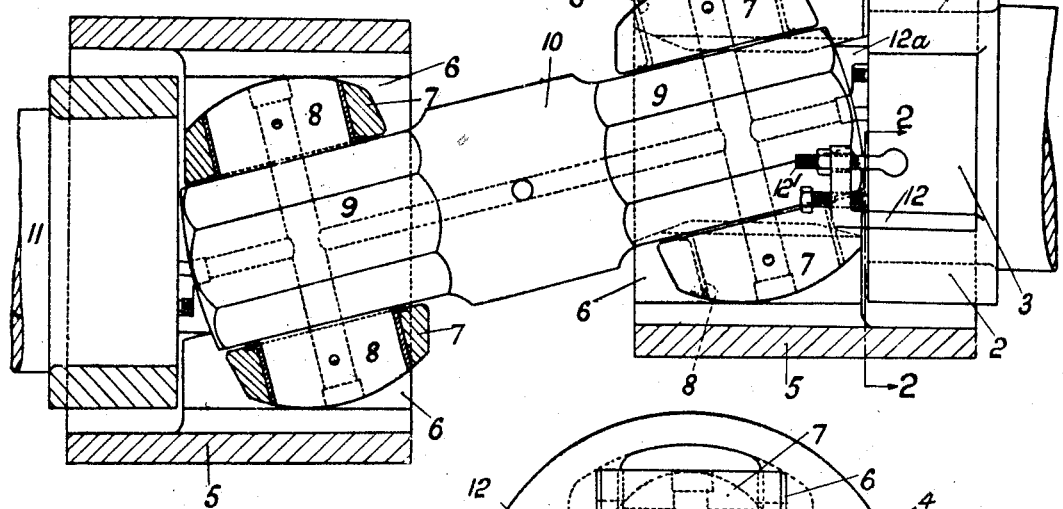
Figure 2:
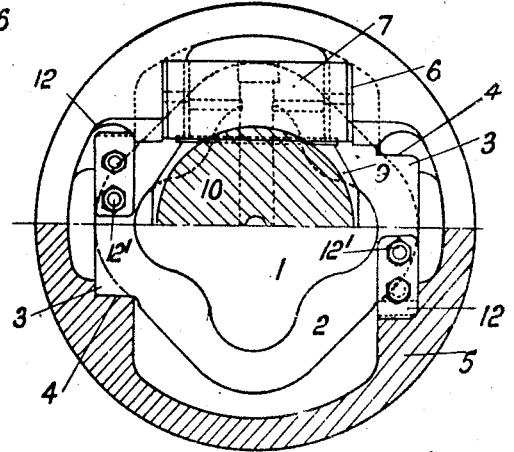
Figure 6:
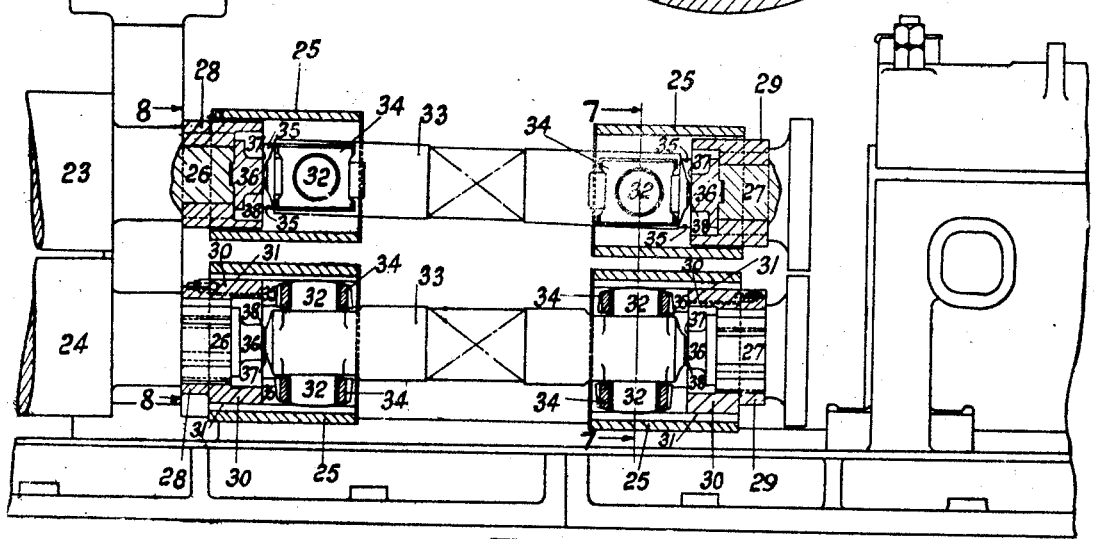
Figure 3:
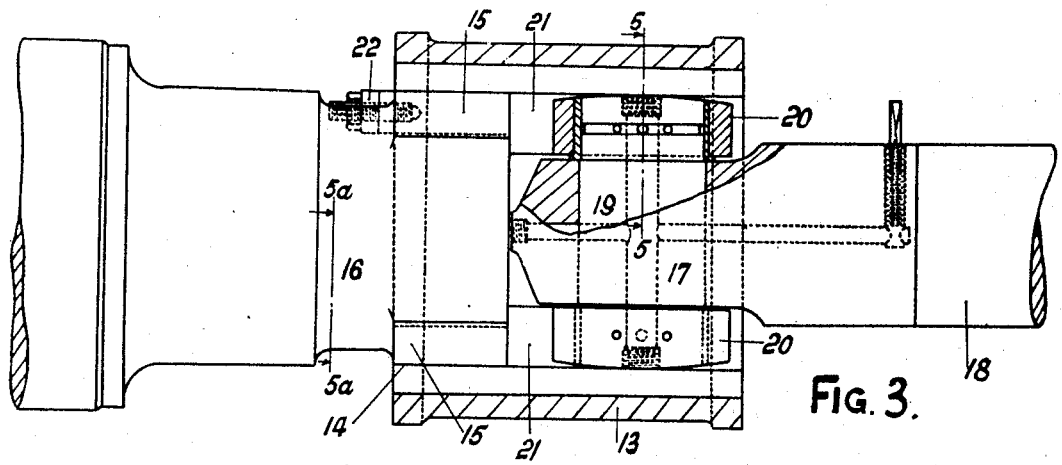
Figure 4:
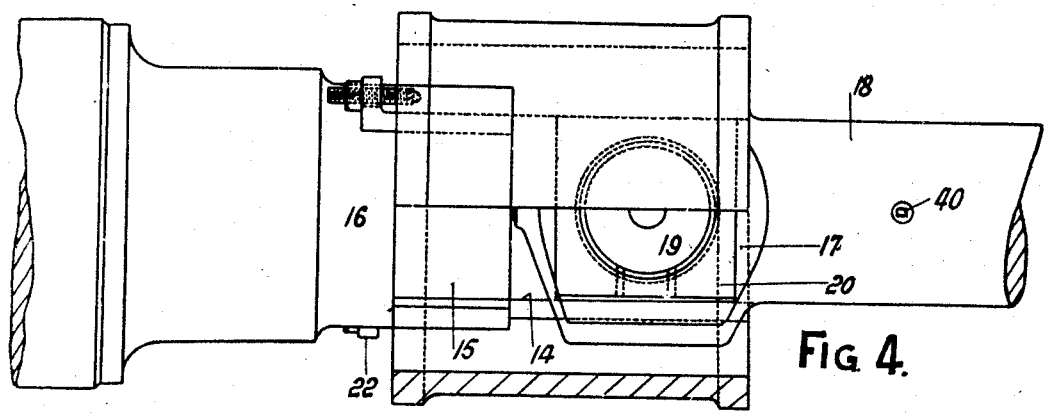
Figure 5:
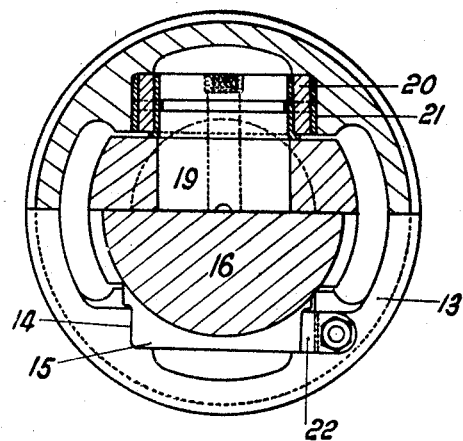
Figure 8:
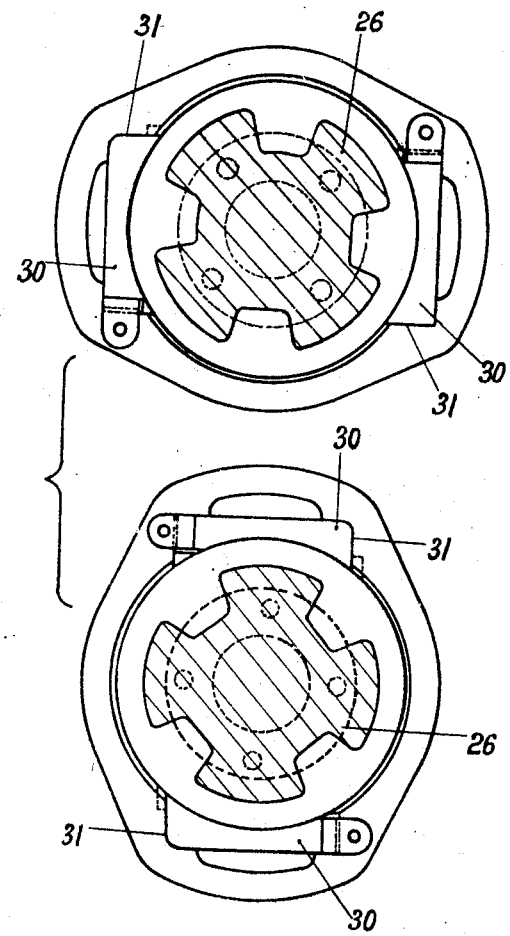
Figure 7:
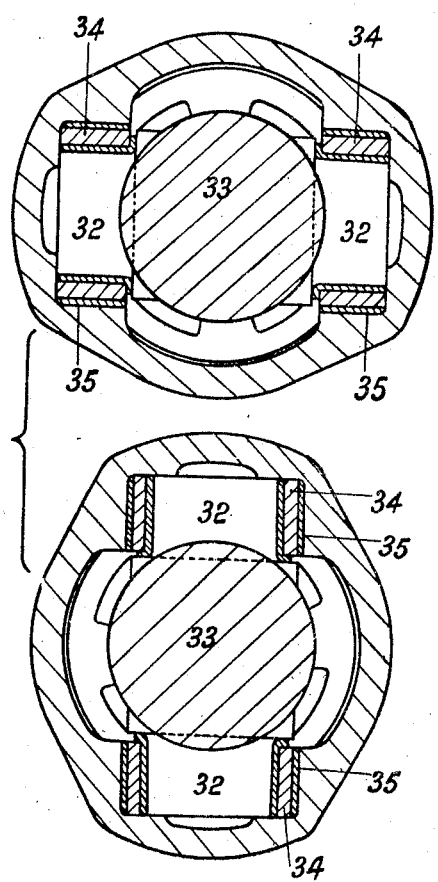

In the accompanying drawings Fig. 1 is a part elevation part vertical section of a universal spindle fitting according to the invention adapted to an existing mill having a fluted roll end; Fig. 2 is a view at right angles to Fig. 1 of a box coupling, the lower half being a section substantially on the line 2—2 of Fig. 1; Fig. 3 is a part elevation part section showing the coupling applied to a roll end which conforms to the shape of the coupling box; Fig. 4 is a view, part section, at right angles to Fig. 3 and Fig. 5 is a view at right angles to Fig. 3, the upper half being a section on the line 5—5 of Fig. 3, and the lower half a section on the line 5ª—5ª of Fig. 3; Fig. 6 is a part elevation part vertical section showing the drive for the top and bottom rolls of a mill having close roll centres; Figs. 7 and 8 are vertical sections substantially on the lines 7—7 and 8—8 respectively, of Fig. 6, drawn to a larger scale.

In the construction shown in Figs. 1 and 2 of the drawings the fluted roll arbor 1 of an existing mill is embraced by an adapter sleeve 2 presenting diametrally opposed projections 3 engaging internal sockets 4 in an externally cylindrical coupling box 5 overhanging the roll end and presenting, in the overhung portion, at right angles to the sockets 4, diametrally opposed internal sockets 6 which accommodate swivel blocks 7 freely mounted on diametrally opposed trunnions 8 forged on the end 9 of a universal spindle 10 operatively connecting the roll with a pinion shaft 11 through a second box coupling similar to the first.

Diametrally disposed keys 12 secured by means of screws 12' are fitted between co-operative faces of the projections 3 and the sockets 4 in the coupling box 5.

In the form shown in Figs. 3, 4 and 5 the box 13 presents diametrally opposed internal sockets 14 engaging diametrally opposed projections formed on the roll end arbor 16.

The end 17 of the universal spindle 18, received within the coupling box 13, is penetrated transversely by a trunnion 19 on which are mounted swivel blocks 20 engaging diametrally opposed internal sockets 21 in the box 13.

Keys 22 are fitted between co-operative faces of the projections 15 and the sockets 21. 40 denotes a usual screw plug closing a conduit for lubricant.

In the form shown in Figs. 6, 7 and 8 the top and bottom rolls 23, 24 of a mill are driven through box couplings 25 of oval section, the major axes of the upper and lower couplings being disposed at right angles to each other.

The fluted roll and pinion arbors 26, 27 respectively, are embraced by adapters 28, 29 having external diametrally opposed projections 30 engaging internal sockets 31 in the box members 25.

Trunnions 32 forged on each end of each universal spindle 33 carry swivel blocks 34 accommodated in diametrally opposed internal sockets 35 of the relative box member 25 in the plane of the major axis thereof.

Bosses 36 secured to the ends of the roll arbors 26 and to the ends of the pinion arbors 27 serve as locating abutments for the adapters 28, 29 and present abutment faces 37 for the part spherical ends 38 of the spindles 33.

What I claim is:—

1. In a rolling mill, in combination, a roll member, a pinion shaft member, one of said members having a pair of diametrally opposed projections, a universal spindle between said members, a trunnion projecting diametrally from said spindle, swivel blocks fitted to said trunnion, and a coupling box presenting a pair of opposed internal sockets to accommodate said swivel blocks and also presenting a pair of internal sockets to engage said diametrally opposed projections, said second pair of sockets being on a diameter transverse to the diameter passing through said first mentioned pair of sockets.

2. In a rolling mill, in combination, a roll member, a pinion shaft member, one of said members having a pair of diametrally opposed projections, a universal spindle between said members, a trunnion projecting diametrally from said spindle, swivel blocks fitted to said trunnion, a coupling box presenting a pair of opposed internal sockets to accommodate said swivel blocks and also presenting a pair of internal sockets to engage said diametrally opposed projections, and keys fitted between the projections and the sockets engaging said projections, said second pair of sockets being on a diameter transverse to the diameter passing said first mentioned pair of sockets.

3. In a rolling mill, in combination, a pair of roll members, a pair of pinion shaft members, each of said members having a set of diametrally opposed projections, spindles interposed between each roll member and a shaft member, trunnions projecting from each end of each spindle, sets of swivel blocks fitted to said trunnions, and coupling boxes of oval section each presenting opposed internal sockets to accommodate a set of swivel blocks and also presenting internal sockets to engage a set of diametrally opposed projections, the major axes of the coupling boxes at the same ends of the two spindles being at right angles to one another.

In testimony whereof I have signed my name to this specification.

THOMAS EDMUND HOLMES.